(12) United States Patent
Martin et al.

(10) Patent No.: US 9,665,453 B2
(45) Date of Patent: May 30, 2017

(54) LAUNCH VEHICLE TESTING SYSTEM

(75) Inventors: Kenneth Lee Martin, St. Petersburg, FL (US); Gregory Allan Sjoquist, St. Petersburg, FL (US)

(73) Assignee: Honeywell International Inc., Morris Plains, NJ (US)

( * ) Notice: Subject to any disclaimer, the term of this patent is extended or adjusted under 35 U.S.C. 154(b) by 754 days.

(21) Appl. No.: 13/611,296

(22) Filed: Sep. 12, 2012

(65) Prior Publication Data
US 2014/0074347 A1    Mar. 13, 2014

(51) Int. Cl.
G06F 11/263    (2006.01)
G06F 11/22     (2006.01)

(52) U.S. Cl.
CPC .................................. *G06F 11/2294* (2013.01)

(58) Field of Classification Search
CPC .................................................... G06F 11/2294
USPC ......................................................... 701/31.5
See application file for complete search history.

(56) References Cited

U.S. PATENT DOCUMENTS

| | | | | |
|---|---|---|---|---|
| 3,305,671 A | * | 2/1967 | Manoni, Jr. ................... | 701/400 |
| 5,206,455 A | * | 4/1993 | Williams et al. ............ | 102/201 |
| 5,271,582 A | * | 12/1993 | Perkins et al. ............. | 244/173.1 |
| 5,654,549 A | * | 8/1997 | Landecker ........... | G02B 27/644 |
| | | | | 250/332 |
| 5,721,431 A | * | 2/1998 | Hersom .................. | B64G 1/22 |
| | | | | 250/340 |
| 5,927,653 A | * | 7/1999 | Mueller et al. ............ | 244/171.3 |
| 6,056,237 A | * | 5/2000 | Woodland .................... | 244/3.15 |
| 6,066,850 A | * | 5/2000 | Hersom .................. | B64G 1/22 |
| | | | | 244/171 |
| 6,119,985 A | * | 9/2000 | Clapp et al. ............... | 244/171.4 |
| 6,157,621 A | * | 12/2000 | Brown et al. .................. | 370/310 |
| 6,237,795 B1 | * | 5/2001 | Buckley et al. .............. | 220/1.5 |
| 6,745,004 B2 | * | 6/2004 | Martin et al. ................ | 455/12.1 |
| 6,845,939 B1 | * | 1/2005 | Baldwin ....................... | 244/7 R |
| 6,845,949 B2 | * | 1/2005 | Blackwell-Thompson | |
| | | | et al. .......................... | 244/173.1 |

(Continued)

OTHER PUBLICATIONS

"Telemetrix 500 Space Bridge (T500SB)", "downloaded Jul. 18, 2012", , pp. 1-2, Publisher: http://www.rtlogic.com/ds-t500sb.php.

(Continued)

*Primary Examiner* — Michael McCullough
*Assistant Examiner* — Michael E Butler
(74) *Attorney, Agent, or Firm* — Fogg & Powers LLC

(57) ABSTRACT

A system for testing a launch vehicle comprises a flight control section including flight electronics, and a non-flight test section coupled to the flight control section. The non-flight test section comprises a first control module in communication with the flight electronics, and a second control module that provides redundancy in communication with the flight electronics. A first network serial interface is coupled to the first control module and configured to provide communication to ground support equipment, and a second network serial interface is coupled to the second control module and configured to provide communication to the ground support equipment. Only one of the first and second control modules is selected at a given point in time to send data to the flight control section. When a non-flight hardware error occurs in the selected control module, the other control module is automatically selected to send data to the flight control section.

20 Claims, 2 Drawing Sheets

(56) References Cited

U.S. PATENT DOCUMENTS

| | | |
|---|---|---|
| 7,302,364 B2 | 11/2007 | Fussell et al. |
| 2002/0171011 A1* | 11/2002 | Lopata et al. ............... 244/172 |
| 2003/0071165 A1* | 4/2003 | Fiebick et al. ............... 244/3.1 |
| 2004/0016852 A1* | 1/2004 | Blackwell-Thompson et al. ............... 244/158 R |
| 2004/0113020 A1* | 6/2004 | Wang et al. ............... 244/165 |
| 2005/0004723 A1* | 1/2005 | Duggan et al. ............... 701/24 |
| 2005/0060474 A1* | 3/2005 | Eng ............... 710/305 |
| 2005/0060484 A1* | 3/2005 | Ogino ............... G11C 29/16 711/103 |
| 2005/0065682 A1* | 3/2005 | Kapadia et al. ............... 701/35 |
| 2006/0038084 A1* | 2/2006 | Fussell et al. ............... 244/173.1 |
| 2006/0174051 A1 | 8/2006 | Lordi et al. |
| 2007/0049204 A1* | 3/2007 | Chun ............... 455/67.11 |
| 2007/0129902 A1* | 6/2007 | Orbell ............... B64D 37/02 702/55 |
| 2008/0316784 A1* | 12/2008 | Cebry ............... H03K 19/0033 363/126 |
| 2010/0096491 A1* | 4/2010 | Whitelaw et al. ............... 244/15 |
| 2010/0200779 A1* | 8/2010 | Kurtz ............... G01L 19/0069 250/515.1 |
| 2011/0055434 A1* | 3/2011 | Pyers et al. ............... 710/14 |
| 2011/0139928 A1* | 6/2011 | Morris et al. ............... 244/1 TD |
| 2013/0043352 A1* | 2/2013 | Bahn et al. ............... 244/171.1 |
| 2013/0132878 A1* | 5/2013 | Tijssen ............... G06F 3/0488 715/770 |
| 2013/0246016 A1* | 9/2013 | Fertig et al. ............... 703/2 |
| 2014/0067164 A1* | 3/2014 | Papadopoulos et al. ......... 701/3 |
| 2015/0248941 A1* | 9/2015 | Thibeault ............... G21F 1/10 252/478 |

OTHER PUBLICATIONS

Schwabacher et al., "Pre-Launch Diagnostics for Launch Vehicles", Oct. 22, 2007, pp. 1-8, Publisher: NASA.

European Patent Office, "European Search Report from EP Application No. 13183049.9 mailed Feb. 27, 2017", from Foreign Counterpart of U.S. Appl. No. 13/611,296, Feb. 27, 2017, pp. 14, Published in: EP.

* cited by examiner

LAUNCH VEHICLE TESTING SYSTEM

BACKGROUND

Assuring flight hardware in a launch vehicle prior to launch and isolating errors on the launch pad has become a critical need in the space industry. Without isolation of faults, launches can be delayed causing excessive costs. Furthermore, until root cause is found, a launch vehicle fault may ground an entire fleet of vehicles. Assuring a vehicle is ready to launch requires a lot of testing, as well as insight, and accessing failed hardware is not always possible on the launch pad.

Although some testability is usually available in launch vehicles, isolation of faults is very limited and it is not uncommon to replace failed equipment and then try to duplicate failures. Without excellent insight into details surrounding a failure, the failure can quickly evolve into an Un-Verified Failure (UVF), causing excessive costs in de-processing hardware to find root cause. The time to find root cause can be excessive, potentially grounding a launch vehicle for months.

SUMMARY

A system for testing a launch vehicle comprises a flight control section including flight electronics in the launch vehicle, and a non-flight test section operatively coupled to the flight control section. The non-flight test section comprises a first electronic control module in operative communication with the flight electronics, and a second electronic control module that provides redundancy with respect to the first electronic control module, the second electronic control module in operative communication with the flight electronics. A first network serial interface is communicatively coupled to the first electronic control module and configured to provide signal communication between the first electronic control module and ground support equipment, and a second network serial interface is communicatively coupled to the second electronic control module and configured to provide signal communication between the second electronic control module and the ground support equipment. Only one of the first and second electronic control modules is selected at a given point in time to send data to the flight control section. When a non-flight hardware error occurs in the selected electronic control module, the other electronic control module is automatically selected to send data to the flight control section.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
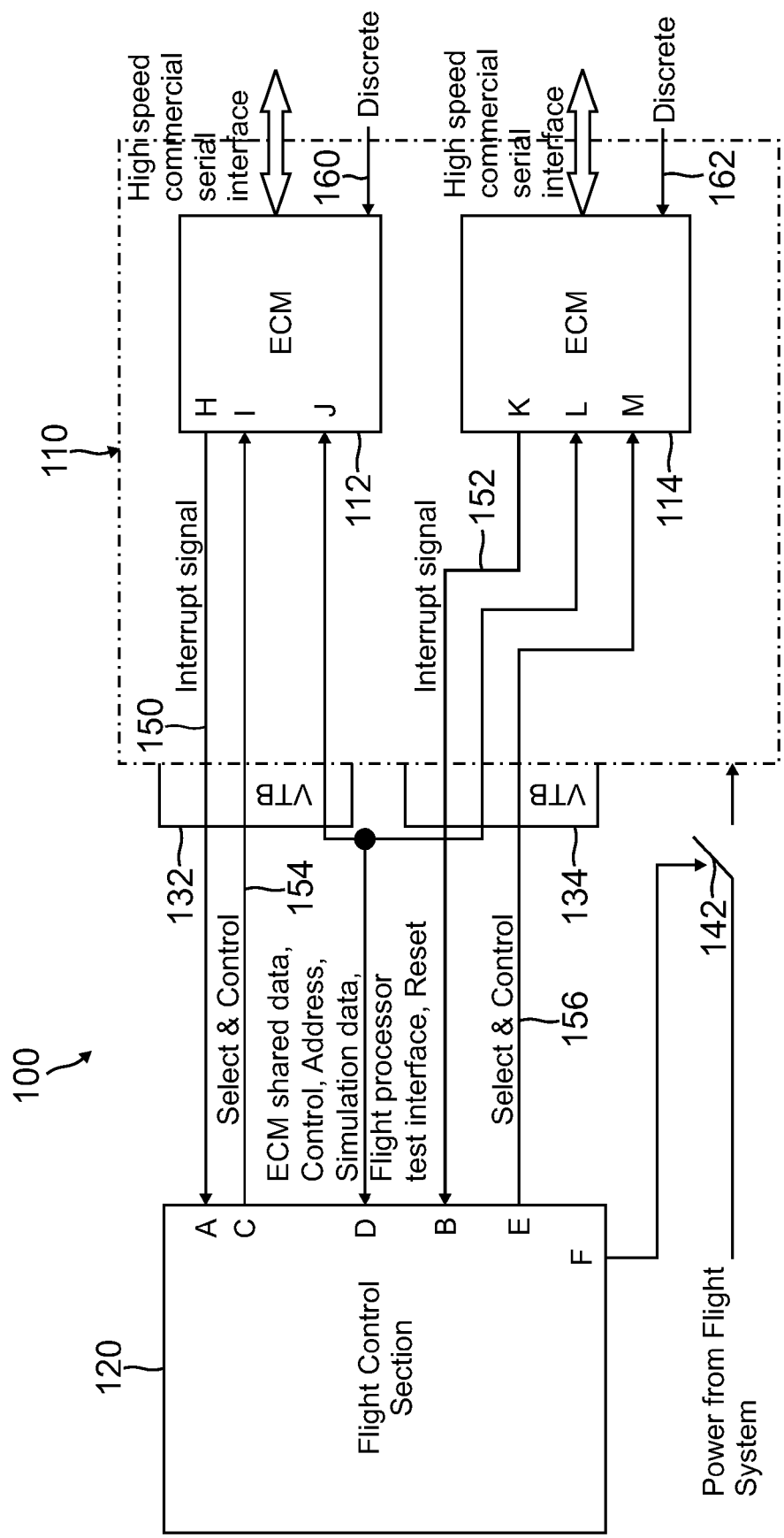
FIG. 1 is block diagram of a launch vehicle testing system according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A launch vehicle testing system is provided that includes a non-flight test section operatively coupled to a flight control section of the launch vehicle. The non-flight test section supports flight circuit testing and troubleshooting in the flight control section through physical communication interfaces that are available without reconfiguring connections to flight hardware. This provides for complex failure mechanisms to be fault isolated in a quick and expeditious manner with minimal delay, allowing for launch-on-time requirements to be met.

The non-flight test section includes a pair of redundant electronic control modules that communicate with flight system electronics in the flight control section. The redundant control modules and embedded software control mechanisms provide the capability to identify when a non-flight hardware error has occurred, and allows isolation to a specific control module that was the cause of the error. Flight hardware automatic reconfiguring of the redundant control module not in error allows for seamless flight system initialization and operation during pre-launch count downs. In addition, multiple redundant copies of flight software can be stored in the control modules so that a single error will not cause a failure of the flight system software to initialize.

The control modules allow connection to the flight hardware in a fashion that supports evolution of the internal capability of the modules with no impact to the flight hardware or software implementation. The control modules can be encapsulated with a protective material to avoid any mechanical difficulties during launch and flight resulting from high vibrations and temperatures.

The flight control section includes highly reliable and radiation hardened electronics used for flight navigation and control in a harsh radiation environment such as outer space. All signals that support the control modules in the non-flight test section are controlled by a radiation hardened processor that performs the processing for the flight. In addition, the interfaces that buffer the flight control section from the non-flight control modules are radiation tolerant.

The non-flight test section can be constructed with commercial off the shelf (COTS) hardware that does not require space flight qualification. This is because the non-flight test section is isolated and powered down during flight as the interfaces of the non-flight test section are not required to operate in flight. Furthermore, the enabling of the signals to communicate to flight hardware are controlled exclusively by flight hardware to assure the flight system is the only method to allow the COTS devices to operate and influence the flight hardware/software. External hardwired signals also support assuring the flight hardware has adequate information to avoid test functions when the test function is undesirable. Thus, the parts selection and manufacturing techniques for the non-flight test section do not require space flight or radiation environment operation. This means more advanced and state of the art embedded processors, which are typically not used in harsh radiation environments, can be employed. This allows heritage and new space flight systems to interface with more advanced hardware for troubleshooting support than would be possible if only space qualified hardware could be utilized.

The use of two electronic control modules and commercially available non-volatile storage allows the flight processor code to be stored not only in both electronic control modules but also allows storage of redundant copies. For power-on initialization, a bootstrap is provided by delaying the reset to the flight hardware to allow the electronic control modules to initialize the lower memory in a dual port memory. A watchdog timer can be used on the flight equipment to allow start-up from the secondary electronic control module for the case of an electronic control module failure to properly configure the lower memory locations in the dual port memory. The flight processor and electronic control module then handshake through the dual port memory to complete initializing and then testing the flight hardware. This can allow test code to be completely separated from flight code with the "final" initialization configuring the flight software.

Further, the use of commercial hardware parts in the non-flight test section enhances testability of a launch vehicle on a launch pad by providing snooping for signals, processor test interfaces, unique test control over the hardware, and can lower the cost of providing non-flight functions. Non-flight functions can include state-of-the-art processors, non-volatile storage, fast memory, and unique interfaces (such as Ethernet, firewire, etc.) to increase the bandwidth of ground support equipment (GSE) communication. With increased bandwidth for GSE communication, complex tasks like tracing signals can become available without removal of hardware.

Just prior to launch, the flight equipment needs to receive the command to disable the GSE. After receiving this command, the flight computer powers-off the devices that are buffered to isolate powered-off signals from flight signals. The flight software also has the capability to re-enable the GSE (including re-application of power) in order to support a launch abort to utilize the GSE interface as part of an orderly launch abort, which can occur late enough in the count down sequence to have been after the GSE was disabled and powered down.

By providing a fault isolation architecture with the parts not powered in flight, a launch vehicle can be assured to be ready for launch even if an interface channel is not communicating. Powering off the devices in the non-flight test section offers electrical isolation for the test function to avoid any electrical concerns in flight.

The present approach allows flight system faults to be isolated away from non-flight system faults during factory testing and also during flight vehicle integration. This means, for example, that if the GSE interface to the flight system fails to function properly, the redundancy provided by the control modules allow fault isolation to either the non-flight or flight system hardware. In addition, as GSE high speed commercial buses (Ethernet, firewire, etc.) have the potential for staying connected to ground test equipment up to umbilical separation at launch, the full capability of the flight system's debug tools is provided without having to change or add any connections to the flight system while it is installed on the launch vehicle.

Factory testing is greatly enhanced with the more reliable interfaces provided by the present test system, which provides the possibility to purge and replace failing (non-flight) hardware without the requirement to do lengthy and costly failure analysis efforts to find exact root cause. Since the hardware in the non-flight test section is considered ground support equipment interfaces only, upon failure the hardware can be purged from a unit and replaced with new hardware.

In addition, the full flight system embedded processor's debug interface is included in the electronic control module, which provides a more reliable test and debug interface for investigating factory test failures. The inclusion of the ability to stream raw sensor data out of the flight system through the electronic control module's high speed interface provides a previously unavailable ability to store sensor data for diagnostics of various factory test failures involving sensors.

During operation, only one of the control modules is selected by the flight system at any given point in time. This allows the flight system (flight software and hardware) to control the redundancy management of the non-flight test section. The system architecture can treat the electronic control modules as a primary/redundant function or can communicate to both electronic control module interfaces for each command/response.

For example, when a command is sent by the GSE to the flight system, the command can be sent to both control modules simultaneously. If both control modules receive the command without error, both will issue their own interrupt to the flight system. The flight software receives both interrupts and processes the command by running a special interrupt service routine which includes reading a message. If both control modules report the same valid status (in their respective dual port memory locations), the command will be serviced by flight hardware including a response back to GSE across each interface channel. When servicing a command that has already been acted on, the flight processor can just update status after validating the message. Any errors, such as a mis-compare of the two control modules by the flight software, can be handled in a user determined fashion by the flight software but will likely include status transmission across the electronic control module channels back to the GSE.

A request by the GSE to read flight data or any other request of available flight system status has the flight system software provide the response to either control module or both depending on user defined functionality. Test functions not needed for launch operations (processor debug, memory reads, updating program code, etc.) can function using a primary/redundant electronic control module architecture and arm/fire or external signals to assure the test functions cannot be activated inadvertently.

A failure of the default (selected) control module to communicate to the flight software will cause the flight software to respond/acknowledge the GSE message/requires on the other control module including a response that includes any available diagnostics data associated with the primary control module fault. This improves reliability for communication to the flight system from test equipment and ground support equipment allowing for better debug and analysis of communication/initialization, and test mode errors.

The processors used in the present system can be implemented using software, firmware, hardware, or any appropriate combination thereof, as known to one of skill in the art. By way of example and not limitation, hardware components for the processor can include one or more microprocessors, memory elements, digital signal processing (DSP) elements, interface cards, and other standard components. Any of the foregoing may be supplemented by, or incorporated in, specially-designed application-specific integrated circuits (ASICs) or field programmable gate arrays (FPGAs). The processor includes or functions with software programs, firmware, or other computer readable instructions for carrying out various process tasks, calculations, and control functions, used in the present method. These instructions are typically tangibly embodied on any appropriate computer program product that includes a computer readable medium used for storage of computer readable instructions or data structures.

The present techniques can be implemented with any available computer readable storage media that can be accessed by a general purpose or special purpose computer or processor, or any programmable logic device. Suitable computer readable media may include storage or memory media such as magnetic or optical media. For example, storage or memory media may include conventional hard disks, volatile or non-volatile storage media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, compact disks (CDs), DVDs, Blu-ray disks, and the like. Combinations of the above are also included within the scope of computer readable media.

Further details of the present approach are described as follows with respect to the drawings.

FIG. 1 is block diagram of a launch vehicle testing system 100 according to one embodiment, which has a redundant fault isolation architecture. The testing system 100 generally includes an "in field" non-flight test section 110 that is operatively coupled to a flight control section 120, which in one embodiment includes standard radiation hardened, space qualified flight electronics.

The non-flight test section 110 includes a pair of redundant electronic control modules (ECMs) 112 and 114 that are in operative communication with flight control section 120. The control modules 112 and 114 each have the same electronic components, and operate at the same time without regard or synchronization to each other. In addition, both control modules 112 and 114 operate the same embedded software code. The control modules 112 and 114 can be operatively coupled to ground support equipment for testing a launch vehicle through respective high speed commercial serial interfaces such as Ethernet connectors. The control modules 112 and 114 are powered on by isolated power supplies that can be turned off prior to launch. Further detail with respect to the control modules is described hereafter with respect to FIG. 2.

FIG. 1 also illustrates the basic connections between non-flight test section 110 and flight control section 120. A first voltage translation buffer (VTB) 132 is operatively coupled between control module 112 and the flight electronics in flight control section 120. A second voltage translation buffer 134 is operatively coupled between control module 114 and the flight electronics in flight control section 120. The voltage translation buffers 132 and 134 have dual power, with the flight control side of the buffers powered by hardware in flight control section 120. The voltage translation buffers 132 and 134 are configured to isolate the flight hardware from control modules 112 and 114 that are unpowered during a flight mode. The flight control section 120 provides a discrete/command to the voltage translation buffer 132 to enable the control module 112 only at power-on.

The non-flight test section 110 can be implemented with components that will meet the thermal requirements of flight control section 120 while on the ground for pre-flight use. The non-flight test section 110 does not function during flight, primarily due to the space radiation environment. This requires non-flight test section 110 to be powered down before the launch vehicle is in the harsher space radiation environment. The flight control section 120 controls this power application and removal so that it can also reapply power for debug use and potential launch abort scenarios that occur after the non-flight test section 110 is powered off just before launch. Since any Ethernet connections are off at this time, the command to turn the non-flight test section 110 back to the "on" state is provided by a flight communication interface that is independent of non-flight test section 110. The flight communication interface commands the flight system software to issue a control signal to turn non-flight test section 110 back on to provide communication to ground equipment during this situation. For example, a flight system control discrete, which is under flight software control, can be sent from output F of flight control section 120 to turn on the hardware of non-flight test section 110 by actuating a flight hardware switch 142 to provide power from the flight system.

Figure 2:
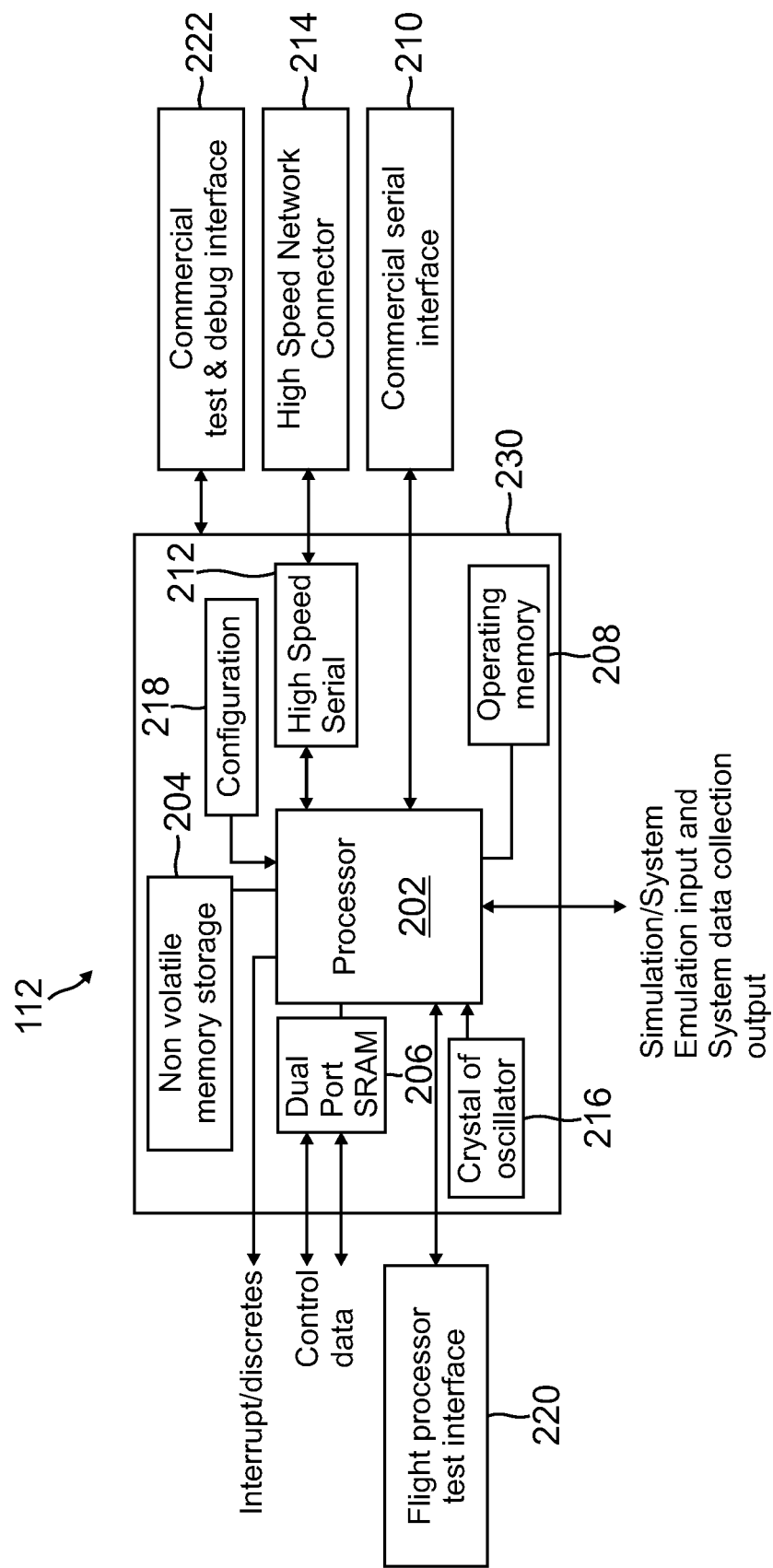
FIG. 2 is block diagram of a redundant electronic control module according to one embodiment employed in the launch vehicle testing system of FIG. 1.

FIG. 2 illustrates further details of control module 112 for the non-flight test section. It should be understood that control module 114 includes the same components as shown in FIG. 2 for control module 112. These components include a processor 202 such as a microcontroller, which is operatively coupled to a first memory unit 204 such as a non-volatile memory storage for storing the electronic control module and the flight processor software, a second memory unit 206 such as a dual port memory (SRAM) for providing a data robust command response communication protocol through shared memory, and a third memory unit 208 (e.g., SDRAM) to utilize fast operating memory to allow a commercial processor to maximize throughput.

The processor 202 is in operative communication with a commercial serial interface 210 such as a Universal Serial Bus (USB) connector. A high speed serial interface 212 operatively couples processor 202 to a high speed network connector 214 such as an Ethernet connector for communicating an Ethernet network. The control module 112 also provides the physical layer for high speed serial interface 212 to perform the PHY functions.

A clock 216 such as a crystal or oscillator is also operatively coupled to processor 202 to provide timing signals. A configuration module 218 is operatively coupled to processor 202 and provides configuration information such as what memory to boot from, what functions of the complex commercial processor are active, power saving information such as sleep modes, etc. The processor 202 is further configured for simulation/system emulation input and system data collection output. The processor 202 also transmits interrupt/discrete signals to the flight system.

A flight processor test interface 220 is in operative communication with processor 202 and is configured to provide for flight system test and debug. In addition, a commercial test and debug interface 222 is in operative communication with non-flight test section 110 and is configured to utilize the commercial processor's test interface (JTAG) to allow the processors to be controlled for development and test.

The control module 112 can be covered with a protective material 230 to provide protection from vibration and shock environments. Exemplary methods that can be employed to cover the control module with the protective covering include plastic encapsulation, conformal coating, or epoxy bonding.

Referring again to FIG. 1, during operation of testing system 100, an interrupt signal 150 is sent from an output H of control module 112 to an input A of flight control section 120. The interrupt signal 150 indicates that control module 112 has data/command ready for the flight system. The interrupt signal 150 can be sent via a dual port memory in control module 112 such as memory unit 206 (FIG. 2). An interrupt signal 152 sent from an output K of control module 114 to an input B of flight control section 120 indicates that control module 114 has data/command ready for the flight system. The interrupt signal 152 can be sent via a general purpose input/output in control module 114.

Select and control signals 154 are sent from an output C of flight control section 120 to an input I of control module 112. The signals 154 include dedicated signals required to enable the interface of only control module 112 with flight control section 120. Likewise, select and control signals 156 are sent from an output E of flight control section 120 to an input M of control module 114. The select and control signals 156 include dedicated signals required to enable the interface of only control module 114 with flight control section 120. Signals are also provided to allow the flight processor to initiate the electronic control module communication to the GSE.

An interface D of flight control section 120 provides for multiple signals (some unrelated to each other), in which some signals are bidirectional and others are unidirectional. These signals are grouped together because of one common characteristic, that is, they are sourced and received by both control module 112 at an interface J and control module 114 at an interface L. The multiple signals include shared data, control, address, simulation data, flight processor test interface, and reset.

The shared data can be sent with a bidirectional interface and provides a mechanism for the flight system to write/read to/from the dual port memory in the control modules 112 and 114. Various control signals provide read enable, etc., which can also be used for communication between the flight system and the dual port memory in the control modules 112 and 114. The address data is sent from the flight system only, and is the address utilized to select a specific address in the selected control module to be read or written to in the dual port memory. The simulation data is bidirectional depending on mode. For example, in a simulation mode, simulation and emulator system data is transmitted into the flight system, whereas in a sensor monitor mode, sensor data is transmitted out of the flight system down to ground support equipment.

Only the selected control module will issue commands to the flight system via the flight processor test interface. The flight system response to the signal from the flight processor test interface can be to both control modules 112 and 114 simultaneously or individually under flight system user control. The flight system generates the reset signals, and control modules 112, 114 will initialize to the proper operational mode depending on the input discrete(s) to control modules 112 and 114.

As shown in FIG. 1, a discrete signal 160 is input into control module 112, and a discrete signal 162 is input into control module 114. The discrete signals include external control for special modes, such as simulation/emulation modes, flight software write enable access, and self-identification for the control modules (e.g., software within a control module can determine if it is a primary or backup control module). The discrete signals also allow for unique software roles/functionality between the two control modules if that is determined to be required by use implementation. The discrete signals are not under flight system control. Rather, these signals are either hard discretes tied to proper state by implementation of Single Board Computer (SBC), such as for self-identification, or they control modes and are level discrete signals coming from external equipment.

The signals sourced by both control modules 112 and 114 only get driven to the flight control section 120 through the voltage translation buffers 132 and 134 when the flight system selects that particular control module through signals 154 or 156 from outputs C or E (which are mutually exclusive of each other). Thus, the flight system can only have data driven to it from one of control modules at a time (the selected one). It should be noted that the flight system can respond/write to both control modules 112 and 114 at the same time interval, allowing for redundant responses across Ethernet channels, but can only receive data from the selected control module.

The dual port memory in each control module serves as a multiple data type communication path/interconnect between the flight system and the non-flight test section, primarily for the purpose of receiving commands and data uploads and for responding to commands with the proper reply data. Use of the Ethernet for telemetry interface is also supported.

A minimum of a two sets/blocks can be reserved in the dual port memory to support command response communication. One set is for inbound GSE to flight system messages, and the other is for outbound flight system to GSE message/status/response. The control module passes commands to the flight system software by use of the inbound mailboxes. The flight software receives an interrupt anytime the control module receives a new command across the Ethernet. Alternatively, the flight software can poll the inbound mailbox on a periodic basis for newly received commands requiring a response. Support for flight system message/status/response is provided by the outbound mailboxes. The control module embedded software supports a polling of the outbound mailboxes in order to provide capability to periodically output flight system messages/status/response. Any communication protocol developed between the flight and non-flight systems utilizes the inbound/outbound mailbox structure to control data flow between the two systems.

The boot section of the dual port memory (where the control module places flight system boot code) is coincident with the flight system reset/initialization vector memory location such that the flight system is able to operate out of the dual port memory with no additional control mechanism provided. The size of the dual port memory boot section is of sufficient depth to allow execution of flight code without use of any communication between the control module and the flight system for bootstrap functions.

Example Embodiments

Example 1 includes a system for testing a launch vehicle, the system comprising: a flight control section including flight electronics in the launch vehicle; and a non-flight test section operatively coupled to the flight control section, the non-flight test section comprising a first electronic control module in operative communication with the flight electronics, and a second electronic control module that provides redundancy with respect to the first electronic control module, the second electronic control module in operative communication with the flight electronics. A first network serial interface is communicatively coupled to the first electronic control module and configured to provide signal communication between the first electronic control module and ground support equipment. A second network serial interface is communicatively coupled to the second electronic control module and configured to provide signal communication between the second electronic control module and the ground support equipment. Only one of the first and second electronic control modules is selected at a given point in time to send data to the flight control section. When a non-flight hardware error occurs in the selected electronic control module, the other electronic control module is automatically selected to send data to the flight control section.

Example 2 includes the system of Example 1, wherein the flight electronics are radiation hardened, space qualified electronics.

Example 3 includes the system of any of Examples 1-2, further comprising a first voltage translation buffer operatively coupled between the first electronic control module and the flight electronics, and a second voltage translation buffer operatively coupled between the second electronic control module and the flight electronics. The first and second voltage translation buffers are configured to isolate the flight electronics from the first and second electronic control modules during flight of the vehicle.

Example 4 includes the system of any of Examples 1-3, wherein the first and second electronic control modules each comprise a processor, a first memory unit operatively coupled to the processor and including a non-volatile memory storage, a second memory unit operatively coupled to the processor and including a dual port memory, and a third memory unit operatively coupled to the processor and including an operating system memory.

Example 5 includes the system of Example 4, wherein the processor in each of the first and second electronic control modules is in operative communication with a respective serial interface connector.

Example 6 includes the system of any of Examples 4-5, wherein the processor in each of the first and second electronic control modules is operatively coupled to a flight processor test interface.

Example 7 includes the system of any of Examples 1-6, wherein the first and second network serial interfaces are Ethernet connectors.

Example 8 includes the system of any of Examples 1-7, wherein the first and second electronic control modules are covered with a protective material that provides protection from vibration and shock.

Example 9 includes the system of any of Examples 1-8, wherein the flight control section is configured to control power application to the non-flight test section when needed prior to launch of the vehicle.

Example 10 includes the system of any of Examples 1-9, wherein the first and second electronic control modules are configured to receive discrete signals from outside of the system.

Example 11 includes the system of any of Examples 1-10, wherein the non-flight test section is configured to be powered down during flight of the launch vehicle.

Example 12 includes the system of any of Examples 1-11, wherein the first and second electronic control modules are configured to receive select and control signals from the flight control section.

Example 13 includes the system of any of Examples 1-12, wherein the first and second electronic control modules are configured to send interrupt signals to the flight control section.

Example 14 includes the system of any of Examples 1-13, wherein the first and second electronic control modules are configured to receive or send a plurality of signals comprising shared data, control, address, simulation data, flight processor test interface data, and reset.

Example 15 includes a method for testing a launch vehicle, the method comprising: providing a non-flight test section operatively coupled to a flight control section of the launch vehicle, the non-flight test section comprising a first electronic control module in operative communication with the flight electronics, and a second electronic control module that provides redundancy with respect to the first electronic control module, the second electronic control module in operative communication with the flight electronics; providing a first network serial interface communicatively coupled to the first electronic control module; providing a second network serial interface communicatively coupled to the second electronic control module; selecting one of the first and second electronic control modules at a given point in time to send data to the flight control section; and when a non-flight hardware error occurs in the selected electronic control module, selecting the other electronic control module to send data to the flight control section.

Example 16 includes the method of Example 15, wherein the first and second network serial interfaces are connected to high-speed commercial media.

Example 17 includes the method of any of Examples 15-16, wherein the first and second network serial interfaces are connected to an Ethernet network.

Example 18 includes the method of any of Examples 15-17, wherein the flight control section controls power application to the non-flight test section when needed prior to launch of the vehicle.

Example 19 includes the method of any of Examples 15-18, wherein the first and second electronic control modules receive discrete signals from ground support equipment.

Example 20 includes the method of any of Examples 15-19, further comprising powering down the non-flight test section during flight of the launch vehicle.

The present invention may be embodied in other forms without departing from its essential characteristics. The described embodiments are to be considered in all respects only as illustrative and not restrictive. Therefore, it is intended that this invention be limited only by the claims and the equivalents thereof.

What is claimed is:

1. A system for testing a launch vehicle, the system comprising:
a flight control section including radiation hardened flight electronics in the launch vehicle, the flight electronics including a radiation hardened flight processor;
a non-flight test section operatively coupled to the flight control section, the non-flight test section comprising:
a first electronic control module in operative communication with the flight electronics; and
a second electronic control module that provides redundancy with respect to the first electronic control module, the second electronic control module in operative communication with the flight electronics;
wherein the first and second electronic control modules include non-radiation hardened electronics;
a first flight processor test interface coupled between the first electronic control module and the radiation hardened flight processor;
a second flight processor test interface coupled between the second electronic control module and the radiation hardened flight processor;
a flight processor control interface configured to assure that the test interfaces are controlled by the flight electronics;
an isolation interface comprising a set of radiation hardened buffers configured to assure that the test interfaces are isolated from the flight processor control interface;
a set of flight control section interfaces configured to assure that enables and direction control to the radiation hardened buffers are managed by the radiation hardened flight processor;

a power interface configured to assure that power switching is controlled by the radiation hardened flight processor and radiation hardened switching electronics, the power interface further configured to assure that test logic is powered-off during flight such that the non-radiation hardened electronics in the non-flight test section are electrically isolated from the flight electronics; and an embedded software control mechanism configured to:
select one of the first and second electronic control modules to send data to the flight control section during a test;
determine whether a non-flight hardware error has occurred in the selected electronic control module;
automatically select the other electronic control module to send data to the flight control section after the non-flight hardware error is determined to have occurred; and
isolate the electronic control module where the non-flight hardware error occurred;
wherein the first and second flight processor test interfaces are configured to provide for redundant flight system test and debug, such that any flight system faults are isolated from any non-flight system faults.

2. The system of claim 1, wherein the flight electronics are space qualified electronics.

3. The system of claim 1, wherein the radiation hardened buffers include:
a first voltage translation buffer operatively coupled between the first electronic control module and the flight control section; and
a second voltage translation buffer operatively coupled between the second electronic control module and the flight control section;
wherein the first and second voltage translation buffers are configured to isolate the flight electronics from the first and second electronic control modules during flight of the vehicle.

4. The system of claim 1, wherein the first and second electronic control modules each comprise:
a processor;
a first memory unit operatively coupled to the processor and including a non-volatile memory storage;
a second memory unit operatively coupled to the processor and including a dual port memory; and
a third memory unit operatively coupled to the processor and including an operating system memory.

5. The system of claim 4, wherein the processor in each of the first and second electronic control modules is in operative communication with a respective serial interface connector.

6. The system of claim 4, wherein the processor in each of the first and second electronic control modules is operatively coupled to a respective one of the first and second flight processor test interfaces.

7. The system of claim 1, further comprising:
a first network serial interface communicatively coupled to the first electronic control module and configured to provide signal communication between the first electronic control module and ground support equipment; and
a second network serial interface communicatively coupled to the second electronic control module and configured to provide signal communication between the second electronic control module and the ground support equipment;
wherein the first and second network serial interfaces are Ethernet connectors.

8. The system of claim 1, wherein the first and second electronic control modules are covered with a protective material that provides protection from vibration and shock.

9. The system of claim 1, wherein the flight control section is configured to control power application to the non-flight test section when needed prior to launch of the vehicle.

10. The system of claim 1, wherein the first and second electronic control modules are configured to receive discrete signals from outside of the system.

11. The system of claim 1, wherein the non-flight test section is configured to be powered down during flight of the launch vehicle.

12. The system of claim 1, wherein the first and second electronic control modules are configured to receive select and control signals from the flight control section interfaces.

13. The system of claim 1, wherein the first and second electronic control modules are configured to send interrupt signals to the flight control section.

14. The system of claim 1, wherein the first and second electronic control modules are configured to receive or send a plurality of signals comprising shared data, control, address, simulation data, flight processor test interface data, and reset.

15. A method for testing a launch vehicle, the method comprising:
performing a test operation using a testing system for the launch vehicle, the testing system comprising:
a flight control section including radiation hardened flight electronics in the launch vehicle, the flight electronics including a radiation hardened flight processor;
a non-flight test section operatively coupled to the flight control section, the non-flight test section comprising:
a first electronic control module in operative communication with the flight electronics; and
a second electronic control module that provides redundancy with respect to the first electronic control module, the second electronic control module in operative communication with the flight electronics;
wherein the first and second electronic control modules include non-radiation hardened electronics;
wherein the test operation is performed by a method comprising:
selecting one of the first and second electronic control modules to send data to the flight control section;
determining whether a non-flight hardware error has occurred in the selected electronic control module;
automatically selecting the other electronic control module to send data to the flight control section after the non-flight hardware error is determined to have occurred; and
isolating the electronic control module where the non-flight hardware error occurred.

16. The method of claim 15, wherein the test system further comprises:
a first network serial interface communicatively coupled to the first electronic control module; and
a second network serial interface communicatively coupled to the second electronic control module;
wherein the first and second network serial interfaces are connected to high-speed commercial media.

17. The method of claim 16 wherein the first and second network serial interfaces are connected to an Ethernet network.

18. The method of claim 15, wherein the flight control section controls power application to the non-flight test section when needed prior to launch of the vehicle.

19. The method of claim 15, wherein the first and second electronic control modules receive discrete signals from ground support equipment.

20. The method of claim 15, further comprising powering down the non-flight test section during flight of the launch vehicle.

* * * * *